Figures 3, 4:
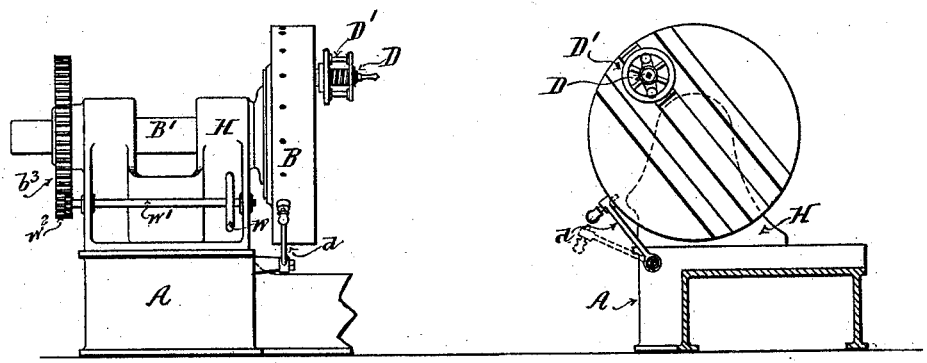

(No Model.) 2 Sheets—Sheet 1.
G. H. CORLISS, Dec'd.
E. A. CORLISS, Administratrix.
MACHINE FOR FINISHING ENGINE BED CASTINGS.
No. 396,987. Patented Jan. 29, 1889.
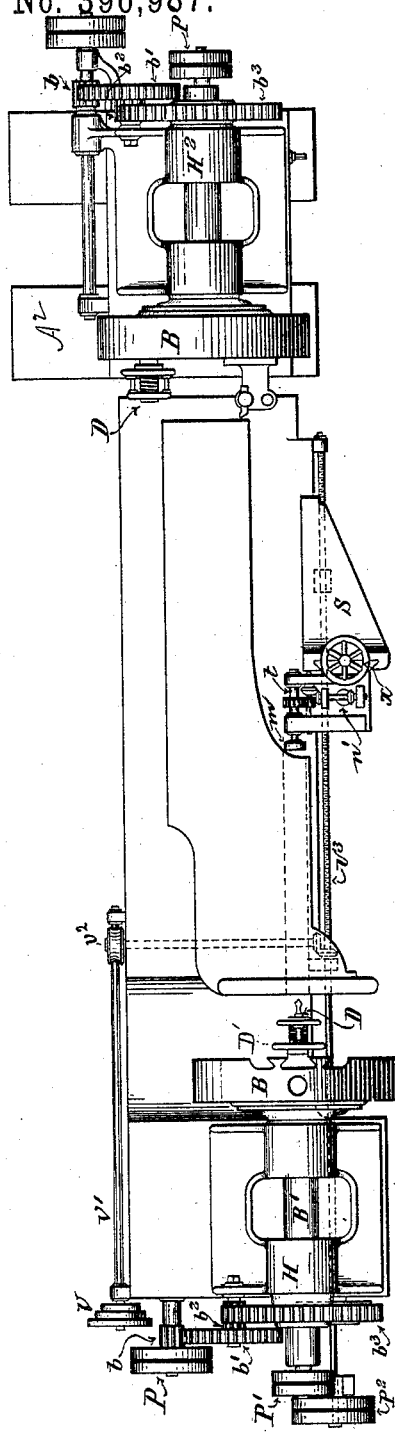
Witnesses.
James Tribe
Henry Marsh Jr.
Inventor.
George H. Corliss.

(No Model.) 2 Sheets—Sheet 2.

G. H. CORLISS, Dec'd.
E. A. CORLISS, Administratrix.
MACHINE FOR FINISHING ENGINE BED CASTINGS.

No. 396,987. Patented Jan. 29, 1889.

Witnesses.
James Tribe
Henry Marsh Jr.

Inventor.
George H. Corliss

UNITED STATES PATENT OFFICE.

GEORGE H. CORLISS, OF PROVIDENCE, RHODE ISLAND; EMILY A. CORLISS ADMINISTRATRIX OF SAID GEORGE H. CORLISS, DECEASED.

MACHINE FOR FINISHING ENGINE-BED CASTINGS.

SPECIFICATION forming part of Letters Patent No. 396,987, dated January 29, 1889.

Application filed December 3, 1887. Serial No. 256,927. (No model.)

*To all whom it may concern:*

Be it known that I, GEORGE H. CORLISS, a citizen of the United States, and a resident of the city and county of Providence, in the State of Rhode Island, have invented a new and useful Machine for Finishing the Beds of Steam-Engines by Milling and other Processes, of which the following is a specification.

I have assembled in one machine means for "squaring up" each end of the bed, and means for drilling the bolt-holes in each end of the bed, and means for milling the guides in the engine-bed, all arranged for either contemporaneous or independent action relatively each to the others.

It has been common heretofore to effect these operations on separate machines. The size and weight of these castings involve labor in transferring them from one machine to another. Care is also necessary to adjust them in the proper positions when the work is performed by separate machines. My invention allows the entire work to be performed at a single mounting of the casting. The tool being itself true, all the several operations are effected with ease and exactness. I also provide for drilling engine-beds of different lengths and of different amounts of offset by changing the position of the mechanism which "squares up" one end of the engine-bed laterally to that which squares up the other.

As a convenient method of describing my invention, I shall divide the machine, as a whole, into three principal systems of mechanism. Under such an analysis the first system will comprise the mechanism adapted to square or "true up" the ends of the bed, the second system will comprise the mechanism for drilling the bolt-holes in either end of the bed, and the third system will comprise the mechanism for milling the guides into proper line. The first two systems are mounted adjustably upon a head, which is in turn adjustable. The third system is mounted upon a saddle moved along the table of the machine and parallel therewith by a worm and gear. Each system is provided with its appropriate operating mechanism.

In the first system a revolving hollow head is mounted upon a hollow shaft journaled in a housing and connected by a train of gears with the shaft of a driving-pulley. In the face of this head are parallel V-slides, in which is fitted a tool-post adapted to move in said slides toward and from the axis of the head for the purpose of feeding the cut in squaring up the ends of the bed. The tool-post is also provided with automatic feed mechanism. The whole is rotated upon the hollow shaft as an axis by power applied through the driving-pulley and the train of gears. This system is duplicated in the machine in order that each end of the engine-bed may be squared up at the same time.

In the second system, upon the above-mentioned hollow revolving head, is fitted a drill-chuck capable of movement in a slot cut in the face of the head, whereby the radial adjustment of the drilling-tool is secured to suit different sizes of beds to be drilled. The drill is driven by power applied through a driving-pulley and a system of beveled gears and shafts inclosed within the hollow head and hollow shaft already specified. In the operation of drilling the hollow head and shaft remain stationary, except as they are rotated to carry the drill to the next succeeding bolt-hole to be drilled in the end of the bed. This system is likewise duplicated in the machine in order that each end of the engine bed may be drilled at the same time.

In the third system a saddle is gibbed upon horizontal ways extending along one side of the table of the machine, and is moved along said ways by a worm and gear. A rotary milling wheel or tool is carried in a chuck journaled upon a rest capable of vertical adjustment on said saddle, and is operated by a train of horizontal and vertical shafts and gears connected with a driving-pulley. By this arrangement of the parts described the mill is moved horizontally while milling one of the guides in the engine-bed, and is raised or lowered in the same vertical plane to mill the other guide. To finish the edges of the guides a stationary planing-tool is substituted for the milling wheel or tool.

I preferably construct the bed-plate or table of the machine in two sections and make provision for adjustment of one section to accommodate different lengths of engine-beds and make other provision for moving said section of the bed-plate laterally to accommodate engine-beds of different amount of offset.

The several systems, when assembled to form the complete machine, are timed relatively one to the other.

Figures 5, 6:
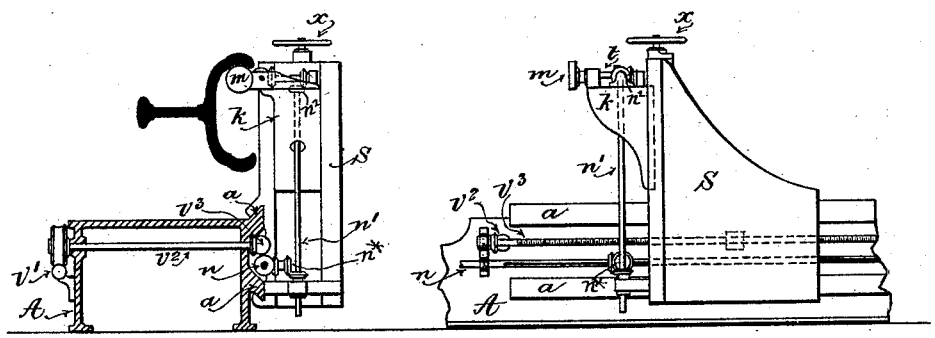
Figures 7, 8:
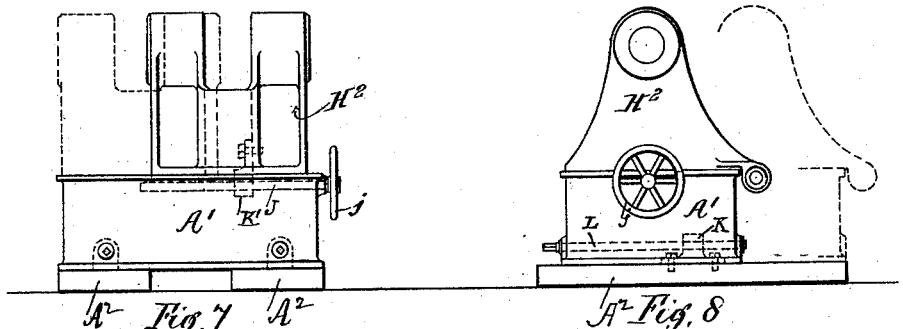

In the accompanying drawings, which form a part of this specification, Figure 1 is a side elevation of my newly-invented machine, with a portion shown in section. Fig. 2 is a top plan of the same. Figs. 3 and 4 are respectively a side and an end elevation of the head of the machine. Figs. 5 and 6 are respectively an end and a side elevation of the milling system, the engine-bed being indicated by the cross-section in black in Fig. 5. Figs. 7 and 8 are side and end views of the adjustable end of the bed of the machine.

Similar letters of reference indicate like parts in all the drawings.

The bed-plate or table A A′ may be in one piece; but I prefer to construct it in two parts to admit of the adjustment of the smaller part or section relatively to the larger to accommodate engine-beds of different amount of offset. The smaller bed plate or section, A′, can be moved laterally upon its bed, as indicated by the dotted lines in Fig. 8, and the housing H² is also movable longitudinally of the bed-plate, as indicated by the dotted lines in Fig. 7, thereby accommodating engine-beds of different lengths.

I will now describe each system, following out the analysis heretofore made of my invention.

In the first system, B is the revolving hollow head mounted upon the hollow shaft or sleeve B′, journaled in the housing H, mounted upon the plate A. Driving-power is applied to the before-described parts through the pulley P and the train of gears $b$ $b'$ $b^2$ $b^3$. In the face of the head B are parallel V-slides, in which the tool-post C, carrying a suitable tool, C′, is fitted to slide radially as actuated by a threaded shaft, $c$, provided at its outward end with a star-wheel, $c'$, adapted to strike against a spring pin or stop, $s$, on each revolution of the head B, thereby feeding the cut as the head revolves. This feed device ceases to operate whenever the spring pin or stop $s$ is moved out of the orbit of the star-wheel $c'$. These parts comprise what I have termed the "first system of mechanism," and they serve only in squaring up the end of the bed.

In the second system—that for boring the holes—the head B is held stationary at certain points. I have a drill-chuck, D, adjustable radially upon the head B and operated by power applied through a driving-pulley, P′, and a train of shafts, $e$ $e'$ $e^2$, connected by bevel-gears inclosed within the head B and hollow shaft or sleeve B′. The drill is fed by a hand-wheel, D′, in the ordinary manner. As the holes in the circular end of the engine-bed should be drilled on a circular line and at regular distances apart, it is necessary that means be provided for insuring uniformity in the traverse of the drill and in the distances separating the bolt-holes. To this end I construct what I term an "index," which consists of a series of holes drilled in the peripheral face of the head B at uniform intervals, and a pawl, $d$, pivoted to the bed-plate A of the machine, immediately below the head, and adapted to engage in consecutive order said series of holes, as shown in Figs. 3 and 4 of the drawings, after the head B has been rotated to the required position by means of the hand-wheel $w$, shaft $w'$, and its pinion $w^2$, geared into $b^3$. When the pawl $d$ engages any hole in the series, the head B is thereby held stationary until the drill has bored a hole in the end of the engine-bed and been withdrawn. Then the head B is again partially rotated to carry the drill D the required distance to bore the next hole, when the pawl is caused to engage the appropriate index-hole and the work of drilling is resumed. This operation is repeated until the bolt-holes have all been bored in the end of the engine-head.

In the third system—that for milling the guides—I have a saddle, S, gibbed upon the horizontal parallel V-slides $a$ $a$ upon the side of the bed-plate or table A of the machine.

The milling wheel or tool $m$ is driven by power applied through the driving-pulley P² and the connected train of horizontal and vertical shafts $n$ $n^*$ $n'$ $n^2$, upon which are feathered bevel-gear wheels communicating power to the spindle $t$ of the milling-wheel. A rest, $k$, vertically adjustable by means of the hand-wheel $x$, carrying a screw, (not shown,) is gibbed upon the front face of the saddle and supports the shaft of the milling wheel or tool $m$. Power to move the saddle along said slides $a$ $a$ to effect the feed is imparted by means of the pulley $v$ and the shafts $v'$ $v^2$, carrying a worm-wheel and bevel-gear wheels geared together and to the threaded shaft $v^3$, as shown.

The smaller table, A′, is adjusted transversely upon supports (see Figs. 1, 7, and 8) by screws L, which are tapped through a block, K, bolted upon the foundation-plate A². By turning these screws in one direction or the other the table A′ and the mechanism carried thereby for treating the small end of the engine-bed are shifted to the right or left. This adjusts my tool for different "offsets" of the engine-bed.

J is a longitudinal screw mounted in bearings in the table A′ and operated by hand-wheel $j$. It is tapped through a block, K′, which forms a part of the movable housing H². By turning this hand-wheel in one direction or the other the housing H² and the mechanism supported thereby are carried longitudinally of the machine. This allows for different lengths of engine-beds.

I claim—

1. In a machine for treating the bed-castings of steam-engines and analogous castings, the combination and arrangement in a single machine of the revolving head B and tool-carriage C, the latter traversing radially in such head while being revolved for squaring the ends, with a saddle, S, traversing longitudinally of the bed, a rest, k, adjustable vertically on such saddle, and a milling-spindle, t, driven by power for milling the guides, adapted to serve interchangeably on the same bed-casting without readjustment thereof, all substantially as herein specified.

2. In a machine for treating the bed-castings of steam-engines and analogous castings, the combination and arrangement in a single machine of the revolving head B and tool-carriage C, the latter traversing radially in such head while being revolved for squaring the ends, with a drill-chuck, D, adjustable radially on the head B, means for adjusting and holding such head in the required positions, and an operating-shaft, e, revolving in the interior of a hollow shaft, B′, on which the head B is mounted for drilling the holes in the required positions, all adapted to serve as herein specified.

3. In a machine for treating the bed-castings of steam-engines and analogous castings, the combination and arrangement in a single machine of the drill-chuck D, adjustable radially on the head B, means for holding such head in the required positions, and an operating-shaft, e, revolved in the interior of the shaft B′ for drilling the holes, with a saddle, S, traversed longitudinally of the bed, a rest, k, adjustable vertically on such saddle, and a milling-spindle, t, driven by power for milling the guides, adapted to serve either simultaneously or independently on the same bed-casting without readjustment of the latter, all substantially as herein specified.

4. In a machine for treating the bed-castings of steam-engines and analogous castings, the combination and arrangement in a single machine of the revolving head B and tool-carriage C, traversed radially on such head, with the saddle S, rest k, and milling-spindle t, the latter driven by power and traversed longitudinally of the bed, and with the drill-chuck D, adjustable radially on the head B, and with means for holding such head in the successively-required positions, and the operating-shaft e, revolved in the interior of the shaft B′, all substantially as herein specified.

In testimony whereof I have hereunto set my hand, at Providence, Rhode Island, this 23d day of November, 1887, in the presence of two subscribing witnesses.

GEORGE H. CORLISS.

Witnesses:
    HENRY MARSH, Jr.,
    JAMES TRIBE.